United States Patent
Kniaz et al.

(10) Patent No.: US 7,996,777 B2
(45) Date of Patent: Aug. 9, 2011

(54) SYNDICATED TRACKABLE AD CONTENT

(75) Inventors: Rob Kniaz, San Francisco, CA (US); Abhinay Sharma, Mountain View, CA (US); Kai Chen, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 11/379,510

(22) Filed: Apr. 20, 2006

(65) Prior Publication Data

US 2008/0010112 A1    Jan. 10, 2008

(51) Int. Cl.
   *G06F 3/00* (2006.01)
(52) U.S. Cl. .................................. 715/760; 705/14.4
(58) Field of Classification Search .................. 715/760; 705/14.4
   See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A * | 9/1999 | Merriman et al. ............ 709/219 |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,039,599 B2 | 5/2006 | Merriman |
| 7,076,443 B1 * | 7/2006 | Emens et al. .................. 705/14 |
| 7,136,875 B2 | 11/2006 | Anderson et al. |
| 2002/0123334 A1 * | 9/2002 | Borger et al. ................ 455/419 |
| 2004/0015397 A1 * | 1/2004 | Barry et al. .................. 705/14 |
| 2004/0093327 A1 * | 5/2004 | Anderson et al. ................ 707/3 |
| 2004/0243581 A1 * | 12/2004 | Weissman et al. ............... 707/9 |
| 2005/0033641 A1 * | 2/2005 | Jha et al. ........................ 705/14 |
| 2005/0076130 A1 * | 4/2005 | Anand et al. .................. 709/228 |
| 2007/0074125 A1 * | 3/2007 | Platt et al. ..................... 715/760 |

FOREIGN PATENT DOCUMENTS

WO    WO 97/21183    6/1997

OTHER PUBLICATIONS

W3school, HTML P Tag, Aug. 2005, pp. 1-5.*
International Search Report and Written Opinion dated Jun. 13, 2008 issued in corresponding PCT application No. PCT/US07/66976, 14 pages.
AdForce, Inc., A Complete Guide to AdForce, Version 2.6, 1998.
AdForce, Inc., S-1/A SEC Filing, May 6, 1999.

(Continued)

*Primary Examiner* — Weilun Lo
*Assistant Examiner* — Tuyetlien T Tran
(74) *Attorney, Agent, or Firm* — Harrity & Harrity, LLP

(57) ABSTRACT

A system sends ad content to a publisher, where the ad content includes a first snippet of code. The system receives requests from browsers accessing a document at the publisher that includes the ad content, where the browsers send the requests based on execution of the first snippet of code. The system transmits, based on receipt of the requests, a second snippet of code to the browsers that instructs the browsers on a content, format and appearance of text to be inserted within the document when the browsers render the document. The system tracks each transmission of the second snippet of code to determine a number of times the text has been displayed at the browsers.

14 Claims, 12 Drawing Sheets

OTHER PUBLICATIONS

AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way To Buy And Sell Web Advertising Space," © 1997.
Information Access Technologies, Inc., Aaddzz.com website archive from www.Archive.org, archived on Jan. 30, 1998.
Zeff, R. et al., *Advertising on the Internet*, $2^{nd}$ Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073, filed on Jul. 30, 2008.
Request for Reexamination of U.S. Patent No. 6,446,045 B1, Control No. 95/001,061, filed on Jul. 7, 2008.
Request for Reexamination of U.S. Patent No. 7,249,059 B2, Control No. 95/001,069, filed on Jul. 21, 2008.
Request for Reexamination of U.S. Patent No. 6,829,587 B2, Control No. 95/001,068, filed on Jul. 14, 2008.
Statement Regarding References in 1449 Form, filed on Feb. 12, 2009.
95/001,073, Filed on: Jul. 30, 2008, Reexamination of Stone et al.
95/001,061, Filed on: Jul. 7, 2008, Reexamination of Stone et al.
95/001,069, Filed on: Jul. 21, 2008, Reexamination of Dean et al.
95/001,068, Filed on: Jul. 14, 2008, Reexamination of Stone et al.

\* cited by examiner

SYNDICATED TRACKABLE AD CONTENT

BACKGROUND

1. Field of the Invention

Implementations described herein relate generally to advertising and, more particularly, to syndicated advertising that includes trackable ad content.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links. Each "hit" may be ranked by the search engine based on various factors, such as, for example, the relevance of the "hit" to the search query.

Existing search engines (e.g., GOOGLE Web search) may also include on-line advertising functionality that may advertise various services and/or products in conjunction with providing search results to users. Such advertisements may be presented to users accessing search results provided by the search engine. An advertisement may include a "creative," which includes text, graphics and/or images associated with the advertised service and/or product. The advertisement may further include a link to an ad "landing document" which contains further details about the advertised service(s) and/or product(s). When a particular creative appears to be of interest to a user, the user may select (or click) the creative, and the associated link causes a user's web browser to visit the "landing document" associated with the creative and link. This selection of an advertising creative and associated link by a user is referred to hereinafter as a "click." The link to the ad landing document contained in the advertisement may include a plain text uniform resource locator (URL).

Existing search engines (e.g., GOOGLE Web Search), to provide advertisements along with search results, may syndicate advertisements from numerous advertisers. The numerous syndicated advertisements may be provided to users using the search engine, or may be provided to publishers that may publish the syndicated advertisements along with the publishers' own hosted content.

SUMMARY

According to one aspect, a method may include transmitting a first snippet of code to a publisher and receiving a request message from a browser that has accessed a document at the publisher that includes the first snippet of code. The method may further include transmitting a second snippet of code, based on receipt of the request message, that writes a portion of text into the document when the document is rendered at the browser.

According to another aspect, a method may include providing content to a server across a network. The method may further include, subsequent to providing the content, providing code to a browser that writes text into a document that includes the content, where the browser has obtained the document that includes the content from the server.

According to a further aspect, a method may include providing content to a server across a network. The method may further include selectively controlling a content, appearance and format of text contained in the provided content from a remote location across the network.

According to yet another aspect, a method may include receiving a document that includes first code configured to request a link when the document is rendered by a browser and sending a link request based on the code. The method may further include receiving second code corresponding to the link in response to the link request and visually rendering a link in the document using the second code.

According to an additional aspect, a method may include providing ad content, where the ad content includes first code configured to request a link when the ad content is rendered by a browser. The method may further include receiving link requests from browsers at a plurality of clients and sending second code to the browsers for writing a link into the ad content, wherein the link includes a reference to an advertising document.

According to a further aspect, a method may include determining a format and appearance of text contained in a document stored at a publisher. The method may further include sending code across a network to a browser, that has accessed the document at the publisher, where the code writes an advertisement into the document when the browser renders the document that has text similar in format and appearance to the text contained in the document.

According to an additional aspect, a method may include sending ad content to a publisher, where the ad content includes a first snippet of code. The method may further include receiving requests from browsers accessing a document at the publisher that includes the ad content, where the browsers send the requests based on execution of the first snippet of code. The method may also include transmitting, based on receipt of the requests, a second snippet of code to the browsers that instructs the browsers on a content, format and appearance of text to be inserted within the document when the browsers render the document. The method may additionally include tracking each transmission of the second snippet of code to determine a number of times the text has been displayed at the browsers.

According to a further aspect, a method may include receiving, at a document publisher, content that includes a snippet of code configured to instruct a browser to request text from a content syndicator. The method may further include associating the content with a document and receiving a request to access the document from a browser. The method may also include providing the document, including the snippet of code, to the browser over a network.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with principles of the invention, a code snippet may be included in ad content provided by an ad syndicating server to publishing servers. The publishing servers may insert the ad content into documents hosted by the publishing servers and provide the documents to the browsers of users that may access the documents via, for example, the Internet. When the documents are rendered at the browsers, the code snippet instructs the browsers to send a request message to the ad syndicating server requesting text that can be inserted into the ad content. In response, the ad syndicating server may return a snippet of code that instructs the browsers on a content and format of text to be written into the ad content. The text may include, for example, a link that, if selected by the user, directs the browser to an ad landing document stored at a hosting server. The ad syndicating server may track each time the snippet of code is sent to a browser to identify how many times a segment of text has been displayed to a user.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. "Syndicated content" or "syndicated ads" as the terms are used herein includes content or ads that are aggregated or stored at a syndicator (e.g., a syndicating server) and then distributed to remote publishing servers (e.g., GOOGLE ADSENSE).

Overview

Figure 1:
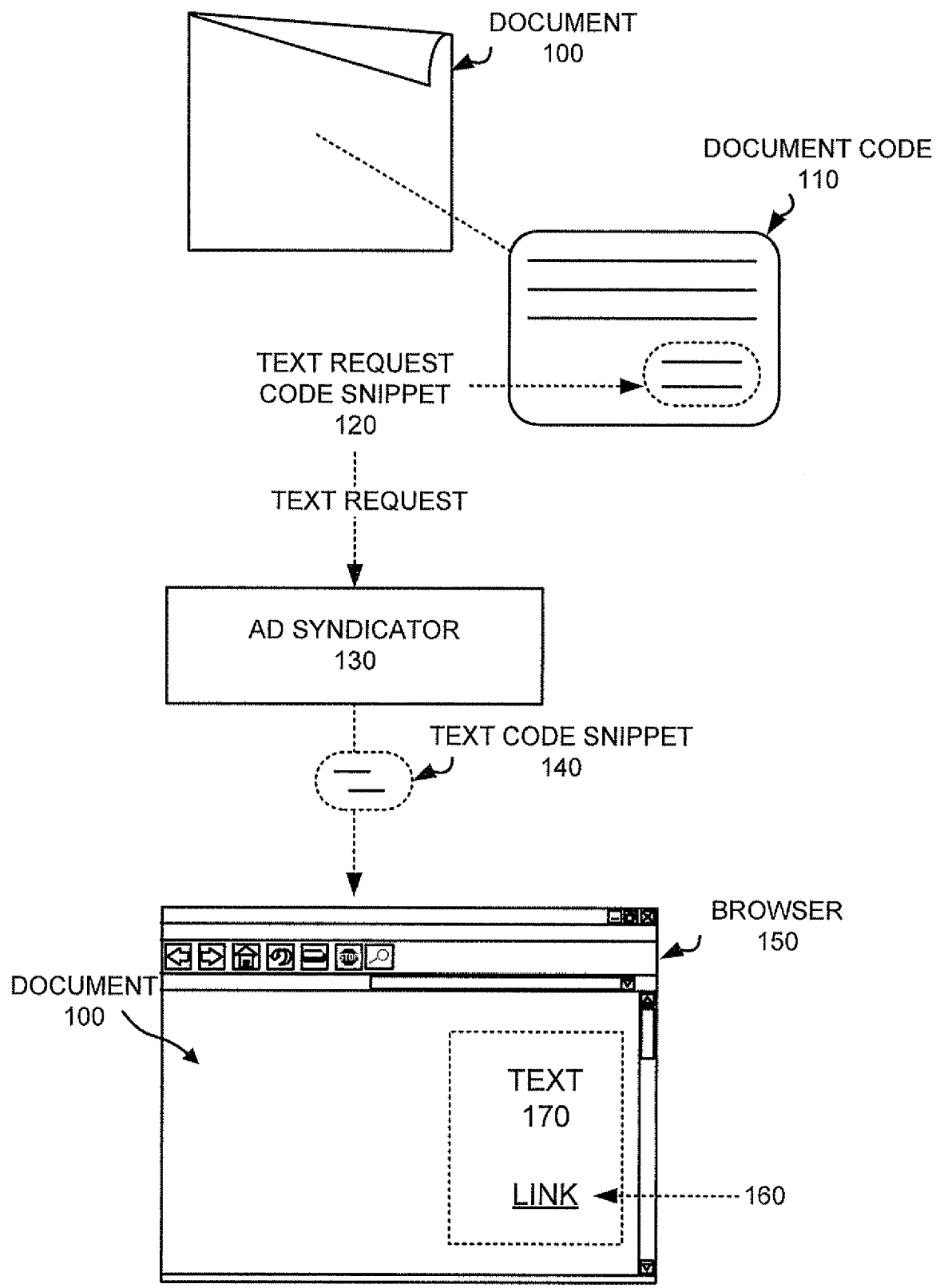
FIG. 1 is an exemplary diagram of an overview of an implementation of the invention.

FIG. 1 illustrates an exemplary overview of the use of code embedded in a document, such as, for example, hypertext markup language (HTML) or Javascript code, for controlling the text and format of text in the document, and for tracking a number of times the text has been viewed by a user. As shown in FIG. 1, a document 100 has document code 110 embedded in it. Document code 110 may include various code portions related to, for example, formatting of the content of document 100. Document code 110 may further include a text request code snippet 120. Text request code snippet 120 may include a portion of code, such as a set of code instructions, that directs a browser to send a message that requests text from an ad syndicator 130. Text request code snippet 120 may include, for example, a set of HTML or Javascript code instructions that direct the browser to send a text request message to the ad syndicator.

When rendered by a browser at a client, text request code snippet 120 may initiate a text request from the client to ad syndicator 130. In response to the text request, ad syndicator 130 may provide a text code snippet 140 that includes instructions relating to the content and format of the text to be inserted into a document at a browser 150. Text code snippet 140 may include, for example, a portion of code, such as a set of code instructions, that instructs a browser to write text with a specified content, format and appearance into a document. The text may include, for example, a link to another document (e.g., a hypertext link), such as, for example, an ad landing document. Browser 150, upon receipt, may execute text code snippet 140 to write text 170 within, for example, an advertisement contained in document 100, possibly including writing a link 160 into document 100. Ad syndicator 130 may, thus, via text code snippet 140, control the content, appearance and format of text 170 and link 160 at the time text 170 and link 160 are rendered at browser 150.

Text code snippet 140 may instruct browser 150 to write text into document 100 that is substantially similar to textual content already contained in document 100. The written text may, therefore, be similar in font, color, style, etc., to content already contained in document 100. The text written into document 100, thus, appears as if it is part of the existing document, and not text subsequently added to the document. Consistent with principles of the invention, ad syndicator 130 may control the rendering of portions of text served to a user by a publisher. Ad syndicator 130 may track each time ad syndicator 130 sends a text code snippet 140 to a browser to determine a number of times the corresponding text has been displayed by a browser.

Exemplary Network Configuration

Figure 2:
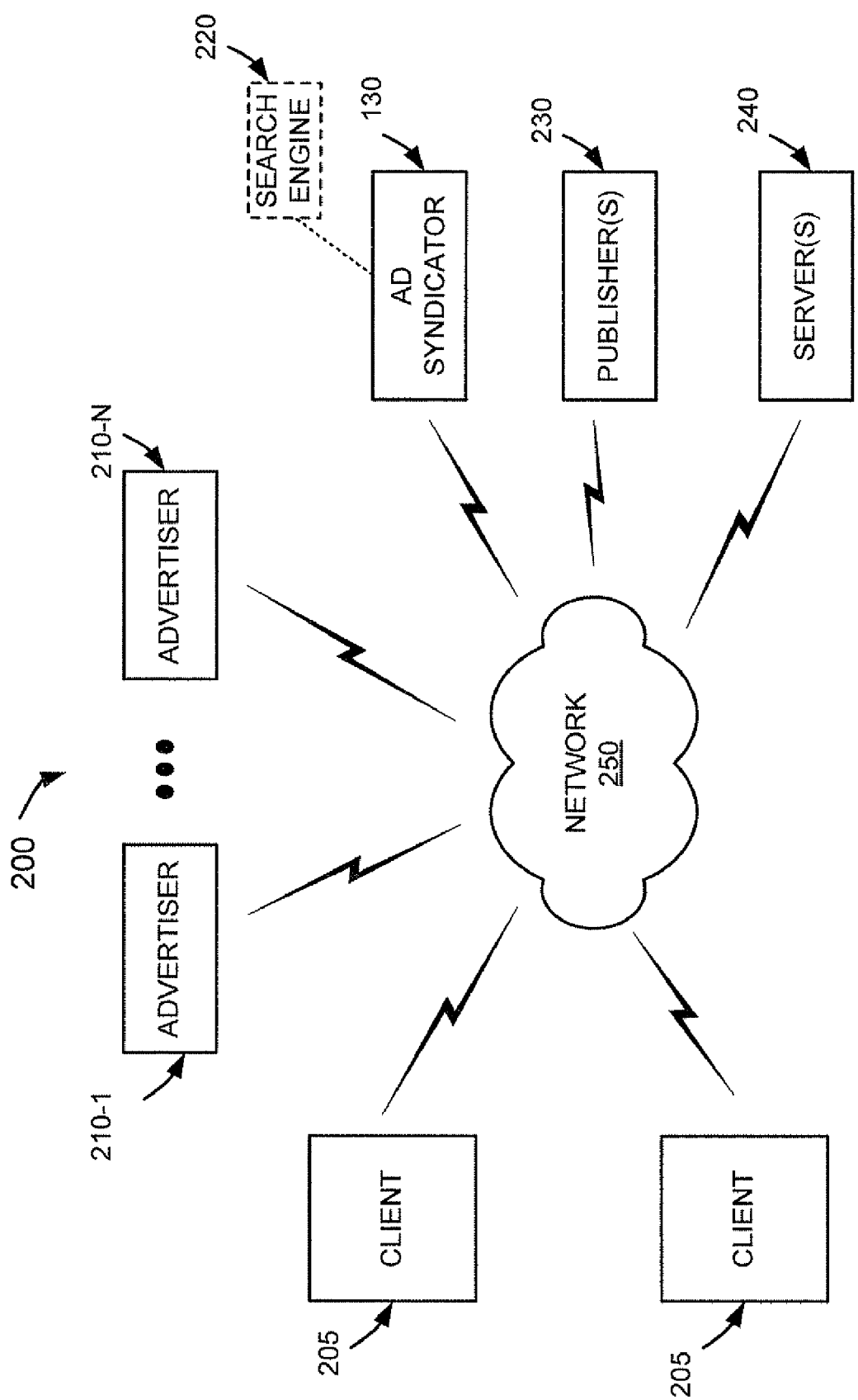
FIG. 2 is an exemplary diagram of a network in which systems and methods consistent with principles of the invention may be implemented.

FIG. 2 is an exemplary diagram of a network 200 in which systems and methods consistent with principles of the invention may be implemented. Network 200 may include multiple clients 205 connected to advertisers 210-1 through 210-N, ad syndicator 130, publisher(s) 230 and server(s) 240 via a network 250. Advertisers 210-1 through 210-N, ad syndicator 130 and publisher 230 may each include a server entity. Two clients 205, server 240 and the server entities including advertisers 210-1 through 210-N, ad syndicator 130 and publisher(s) 230 have been illustrated as connected to network 250 for simplicity. In practice, there may be more or fewer clients and servers. Also, in some instances, a client may perform one or more functions of a server and a server may perform one or more functions of a client.

Clients 205 may include devices, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at advertisers 210-1 through 210-N, ad syndicator 130, publisher 230 or server(s) 240.

Ad syndicator 130 may include a server entity that accesses, fetches, aggregates, processes, searches and/or maintains documents. Ad syndicator 130 may implement a data aggregation service by crawling a corpus of documents hosted on advertisers 210-1 through 210-N, publisher 230 or server(s) 240, indexing the documents, and storing information associated with these documents in a repository of crawled documents. The aggregation service may be implemented in other ways, such as by agreement with the operator(s) of advertisers 210-1 through 210-N, publisher 230 or server(s) 240 to distribute their documents via the data aggregation service.

In an implementation consistent with principles of the invention, ad syndicator 130 may include a search engine 220 usable by users at clients 205. Search engine 220 may execute a search using a query, received from a user at a client 205, on the corpus of documents stored in the repository of crawled documents. Ad syndicator 130 may further receive advertisement placement bids, from advertisers 210-1 through 210-N, and may provide advertisements to publisher 230 based on the received advertisement placement bids.

Publisher(s) 230 and server(s) 240 may store or maintain documents that may be browsed by clients 205. Such documents may include data related to published news stories, products, images, user groups, geographic areas, or any other type of data. For example, publisher 230 and server(s) 240 may store or maintain news stories from any type of news source, such as, for example, the Washington Post, the New York Times, Time magazine, or Newsweek. As another example, publisher 230 and server(s) 240 may store or maintain data related to specific products, such as product data provided by one or more product manufacturers. As yet another example, publisher 230 or server(s) 240 may store or maintain data related to other types of web documents, such as pages of web sites. Publisher 230 may host advertisements, in addition to other content hosted by publisher 230, provided by ad syndicator 130.

While advertisers 210-1 through 210-N, ad syndicator 130, publisher 230 and server(s) 240 are shown as separate entities, it may be possible for one of ad servers 210-1 through 210-N, ad syndicator 130, publisher 230 or server(s) 240 to perform one or more of the functions of the other one of advertisers 210-1 through 210-N, ad syndicator 130, publisher 230 or server(s) 240. For example, it may be possible that ad syndicator 130 and publisher 230 can be implemented as a single server. It may also be possible for a single one of advertisers 210-1 through 210-N, ad syndicator 130, publisher 230 and server(s) 240 to be implemented as two or more separate (and possibly distributed) devices.

Network 250 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
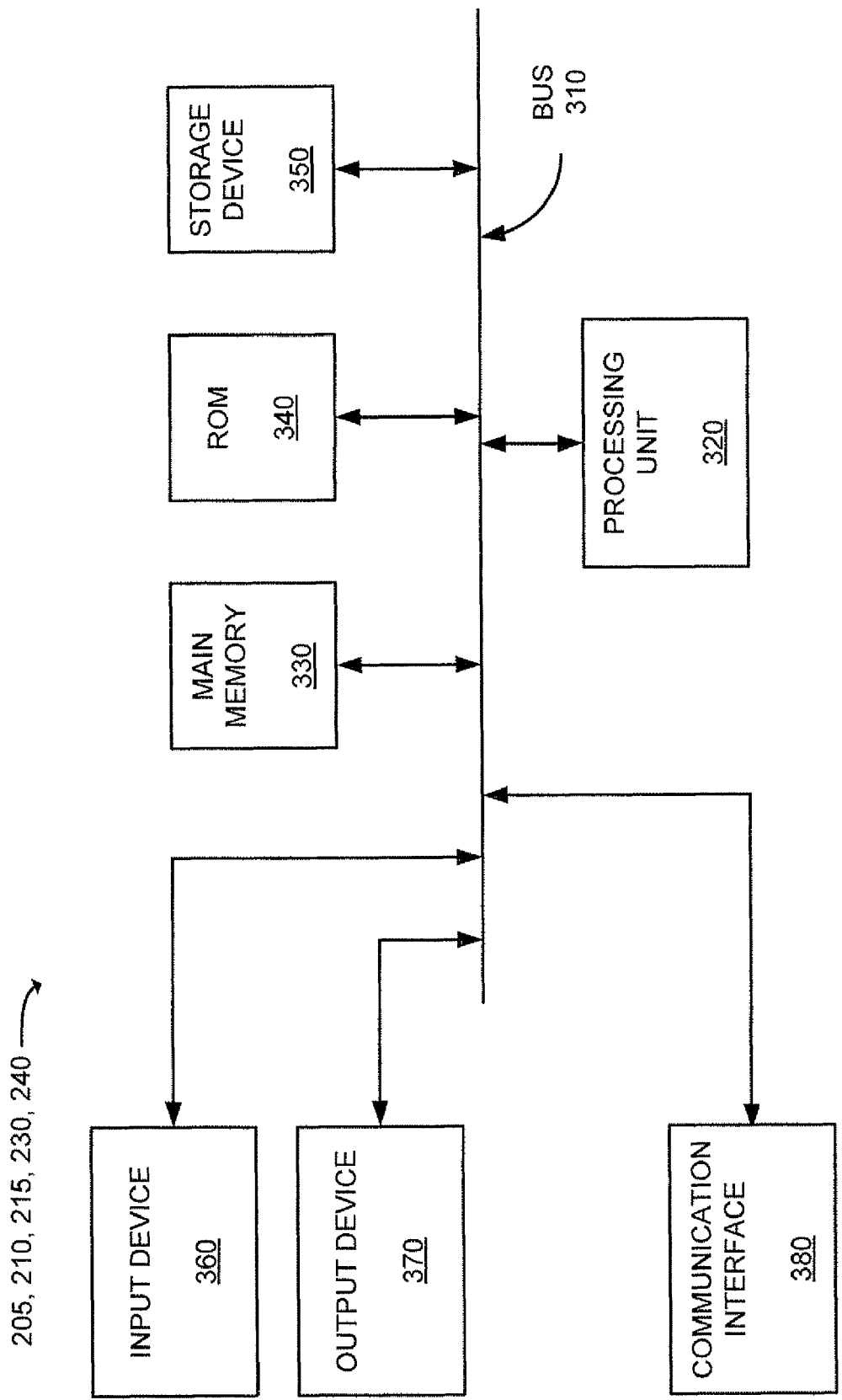
FIG. 3 is an exemplary diagram of a client or server entity of FIG. 2 according to an implementation consistent with principles of the invention.

FIG. 3 is an exemplary diagram of a client or server entity (hereinafter called "client/server entity"), which may correspond to one or more of clients 205, advertisers 210-1 through 210-N, ad syndicator 130, publisher 230 and/or server(s) 240, according to an implementation consistent with principles of the invention. The client/server entity may include a bus 310, a processing unit 320, a main memory 330, a read only memory (ROM) 340, a storage device 350, an input device 360, an output device 370, and a communication interface 380. Bus 310 may include a path that permits communication among the elements of the client/server entity.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 220.

The client/server entity, consistent with the principles of the invention, may perform certain operations or processes, as will be described in detail below. The client/server entity may perform these operations in response to processing unit 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processing unit 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Ad Syndicator Process

Figure 4:
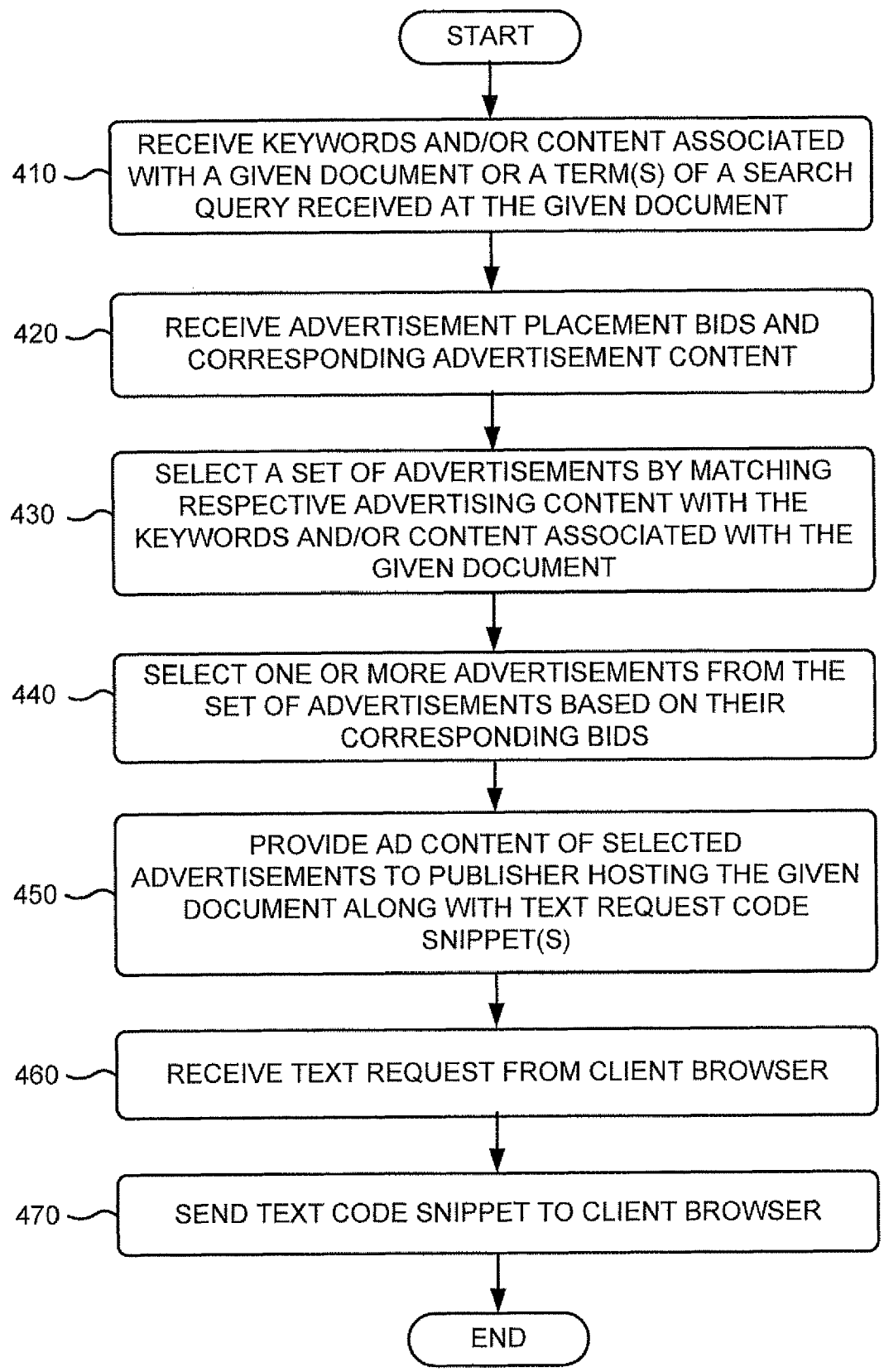
FIG. 4 is a flowchart of an exemplary process for the provision of ad content, including snippets of text request code, from the ad syndicator to the publisher of FIG. 2 consistent with principles of the invention.

FIG. 4 is a flowchart of an exemplary process for the provision of ad content, including snippets of text request code, from ad syndicator 130 to publisher 230. The process exemplified by FIG. 4 may be implemented by ad syndicator 130.

Figure 5:
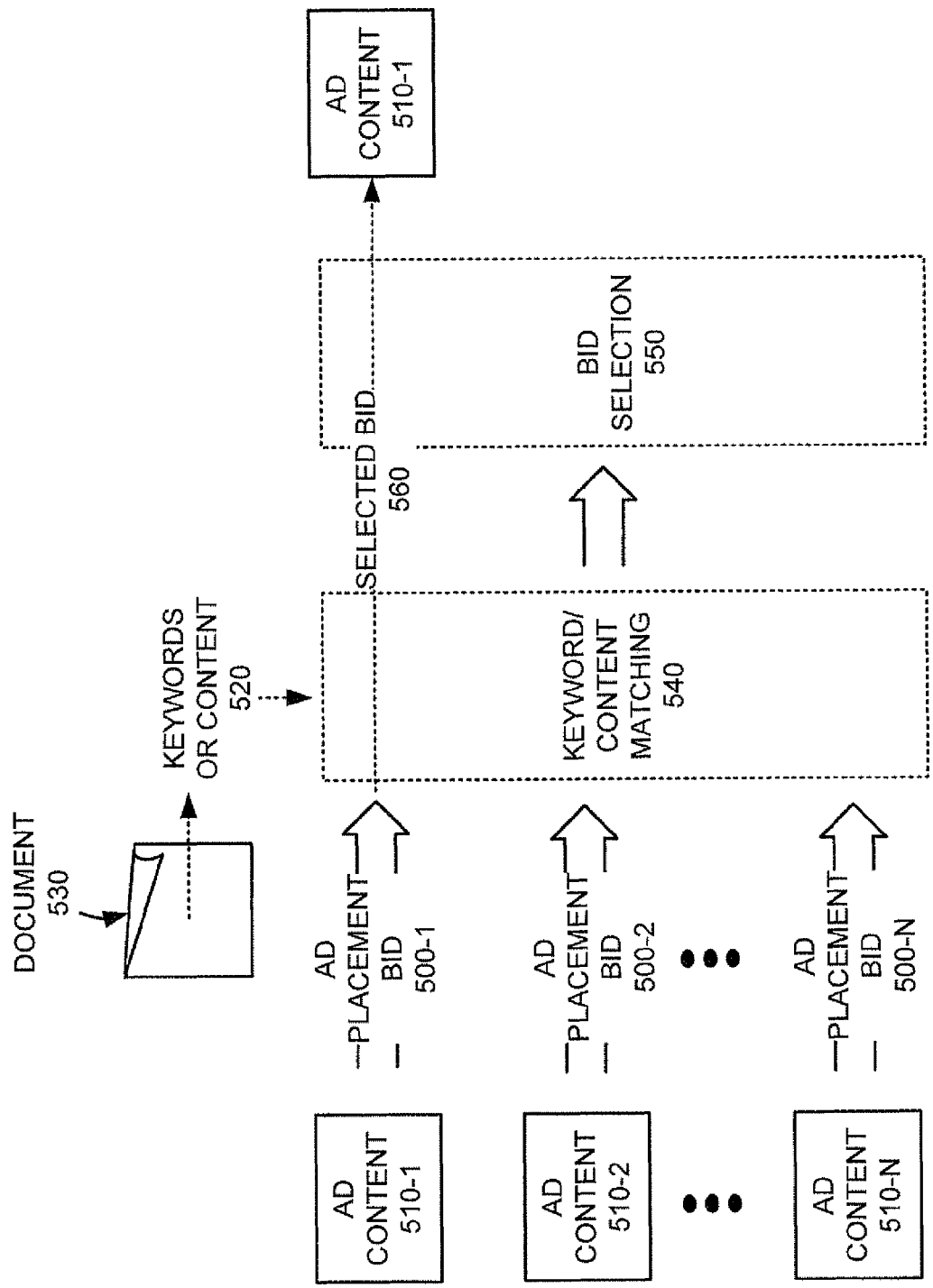
FIG. 5 is a diagram that graphically illustrates the bidding portion of the exemplary process of FIG. 4.

The exemplary process may begin with the receipt of keywords and/or content associated with a given document, or a term(s) of a search query received at the given document (block 410). The given document may be stored at, and hosted by, publisher 230. The content of the given document may include any text, images, or other type of data contained in the given document. The keywords and/or content may be provided by publisher 230, or ad syndicator 130 may "crawl" the given document to identify the keywords and/or content. The keywords may include one or more different words that label the given document, or which are representative of the content contained in the given document. FIG. 5 illustrates keywords or content 520 associated with a given document 530. The document 530 may be stored at publisher 230 and publisher 230 may provide the keywords or content 520. In another implementation, a user at a client 205 browsing the document 530 may enter a search query at the document (e.g., to perform a search) and one or more terms of the search query may be provided to ad syndicator 130 as keywords or content 520 (block 410).

Figure 6:
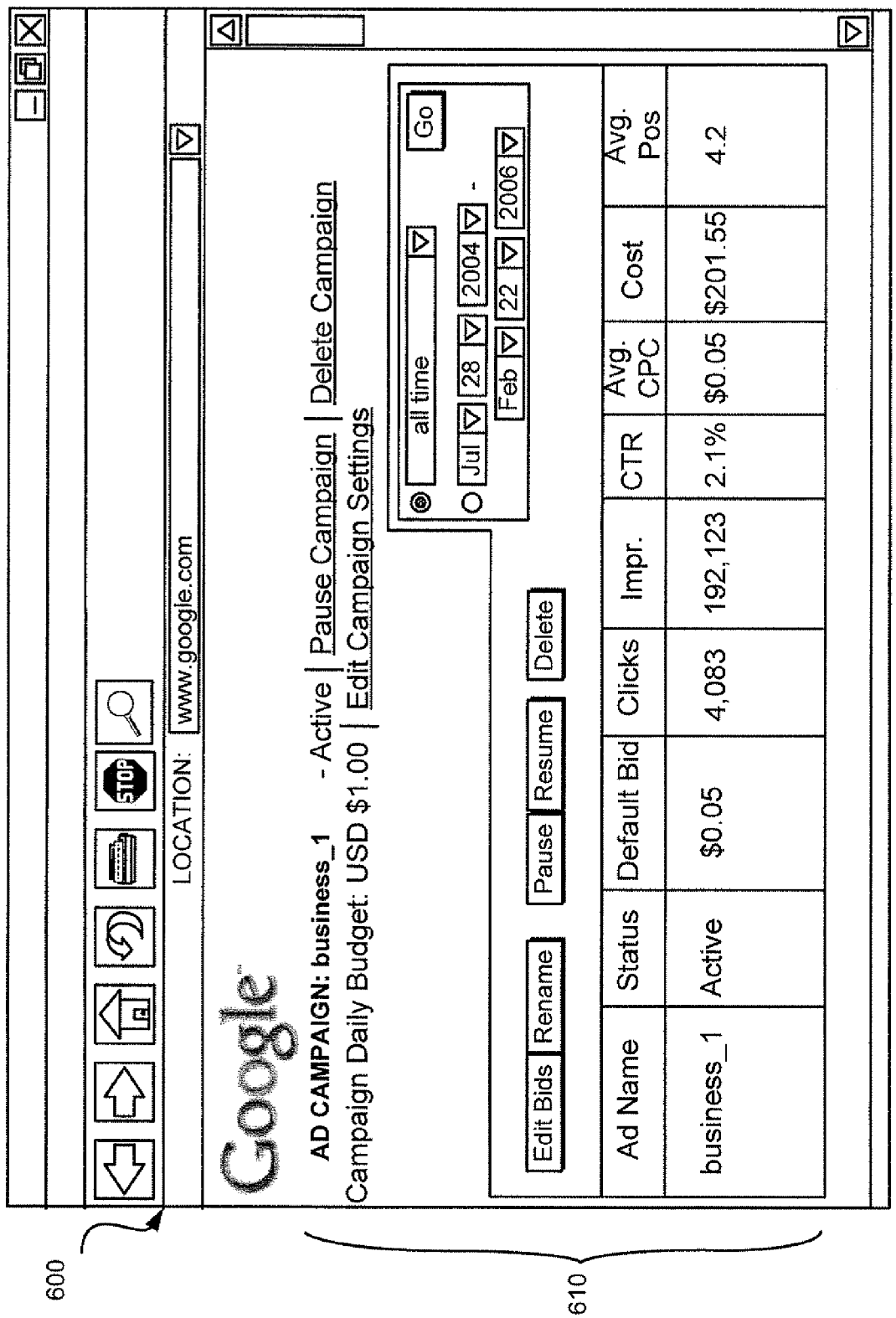
FIG. 6 is a diagram of an exemplary document for entering advertisement placement bids consistent with principles of the invention.

Advertisement placement bids and corresponding advertisement content associated with respective advertisements may be received (block 420). The advertisement placement bids and corresponding advertisement content may be received by ad syndicator 130 from advertisers 210-1 through 210-N via network 250. As shown in FIG. 5, advertisement placement bids 500-1 through 500-N, and corresponding ad content 510-1 through 510-N, may be received for bid selection. Bids may be placed at advertisers 210 using, for example, advertisement bidding document 600 illustrated in FIG. 6. Advertisement bidding document 600 may include entry fields 610 that permit a user to enter one or more ad campaigns, each of which includes a bid for placement of a respective advertisement by ad syndicator 130. Entry fields 610 may include, for example, a field for entering a name of an ad campaign and a field for entering a bid amount.

A set of advertisements may be selected by matching respective advertising content with the keywords and/or content associated with the given document (block 430). The advertising content of respective advertisements may be compared to the keywords and/or content associated with the given document to identify advertisements having content that is the same or similar to the keywords and/or content of the given document. As shown in FIG. 5, keywords or content 520 can be used in the keyword/content matching process 540 to identify content in ad content 510-1 through 510-N that is the same or similar to keywords or content 520. The advertisement content associated with each selected advertisement may include a "creative" which includes text, graphics and/or images associated with the advertised service and/or product. In another implementation, publisher 230, and not ad syndicator 130, may select the ad(s) to display, bypassing the keyword or content matching and bidding of blocks 410, 420, 430 and 440. In a further implementation, publisher 230 may be provided ads from ad syndicator 130 using the keyword or content matching and bidding of blocks 410, 420, 430 and 440 in addition to ad(s) selected by publisher 230.

One or more advertisements from the set of advertisements may be selected based on their corresponding bids (block 440). The bids of the selected set of advertisements may be compared with one another to select one or more of the highest bids, possibly in conjunction with other criteria. As shown in FIG. 5, a bid selection process 550 may select a bid 560 from bids 500-1 through 500-N.

Figure 7:
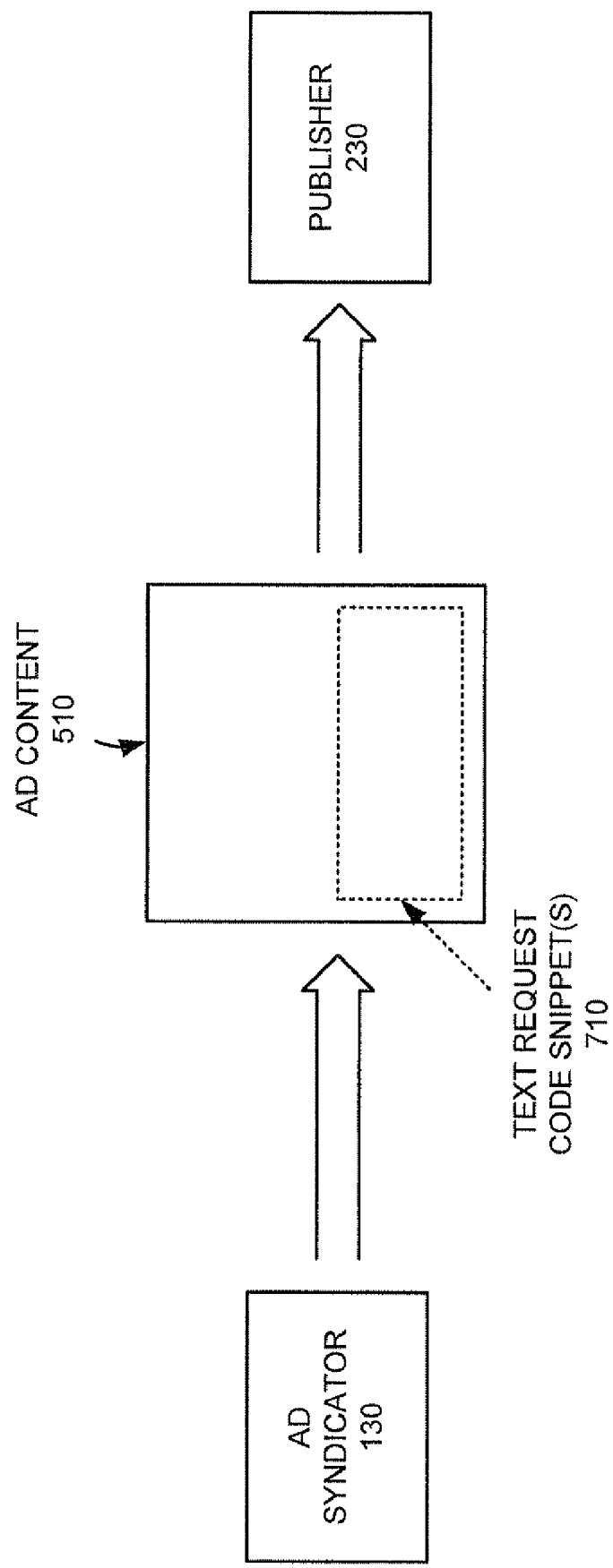
FIG. 7 is a diagram that graphically illustrates the provision of an ad with a text request code snippet(s) from the ad syndicator to the publisher of FIG. 7 consistent with principles of the invention.

Ad content of the selected one or more advertisements may be provided to publisher 230 that is hosting the given document, along with respective code snippets that include code for requesting text from ad syndicator 130 (block 450). The text request code snippets may include hypertext markup language (HTML) or Javascript code. Each text request code snippet may include code that accepts input parameters, such as, for example, an identifier of text that should be generated, and an identifier for a specific publisher requesting the text. Each text request code snippet, when executed by a web browser accessing the given document, initiates the transmission of a text request message to ad syndicator 130 requesting that ad syndicator 130 provide text corresponding to the text identifier. As shown in FIG. 7, ad syndicator 130 may provide ad content 510 to publisher 230 that includes a corresponding text request code snippet(s) 710. In one implementation, the text request code snippet may include code that accepts an identifier of a link that should be generated, and a specific publisher requesting the link.

A text request may be received from a client browser rendering an advertisement that includes a text request code snippet (block 460). The text request may include an identifier of the requested text and an identifier of the hosting publisher 230. A client browser, rendering an advertisement hosted in the given document at publisher 230, may transmit the text request based on commands contained in the text request code snippet included in the rendered document. Ad syndicator 130 may send a text code snippet to the client browser (block 470). The text code snippet may include HTML or Javascript code that instructs the web browser how to render text through a document write method. The text code snippet 140 may instruct the browser on the content, appearance and format of the text to be written. For example, the text code snippet may instruct the browser to write text into the document that is substantially similar to textual content already contained in the document. The written text may, therefore, be similar in font, color, style, etc., to content already contained in the document. The instructions contained in the text code snippet that specifies a content and format of the text may be dependent on the text identifier and publisher identifier included in the text request. The web browser at client 205 may use the text code snippet as described below with respect to block 1060 of FIG. 10. Ad syndicator 130 may track each time ad syndicator 130 sends a given text code snippet to browsers to determine a number of times the text has been displayed by browsers.

The text code snippet may also include additional features for the link. For example, the text code snippet may include code for an "OnHover" method which would allow custom branding/messaging to be displayed when a cursor (e.g., a mouse) at a browser of a client 205 is "hovered" over the text. In some implementations, a link included in the text may be disabled by ad syndicator 130, allowing the text to be "shutdown" in cases determined by a respective advertiser 210 or by ad syndicator 130. For example, if it is determined that a link should be disabled, ad syndicator 130 may not return a text code snippet to a requesting client browser in response to a text request, or may return a text code snippet that contains a null value.

Exemplary Publisher Process

Figure 8:
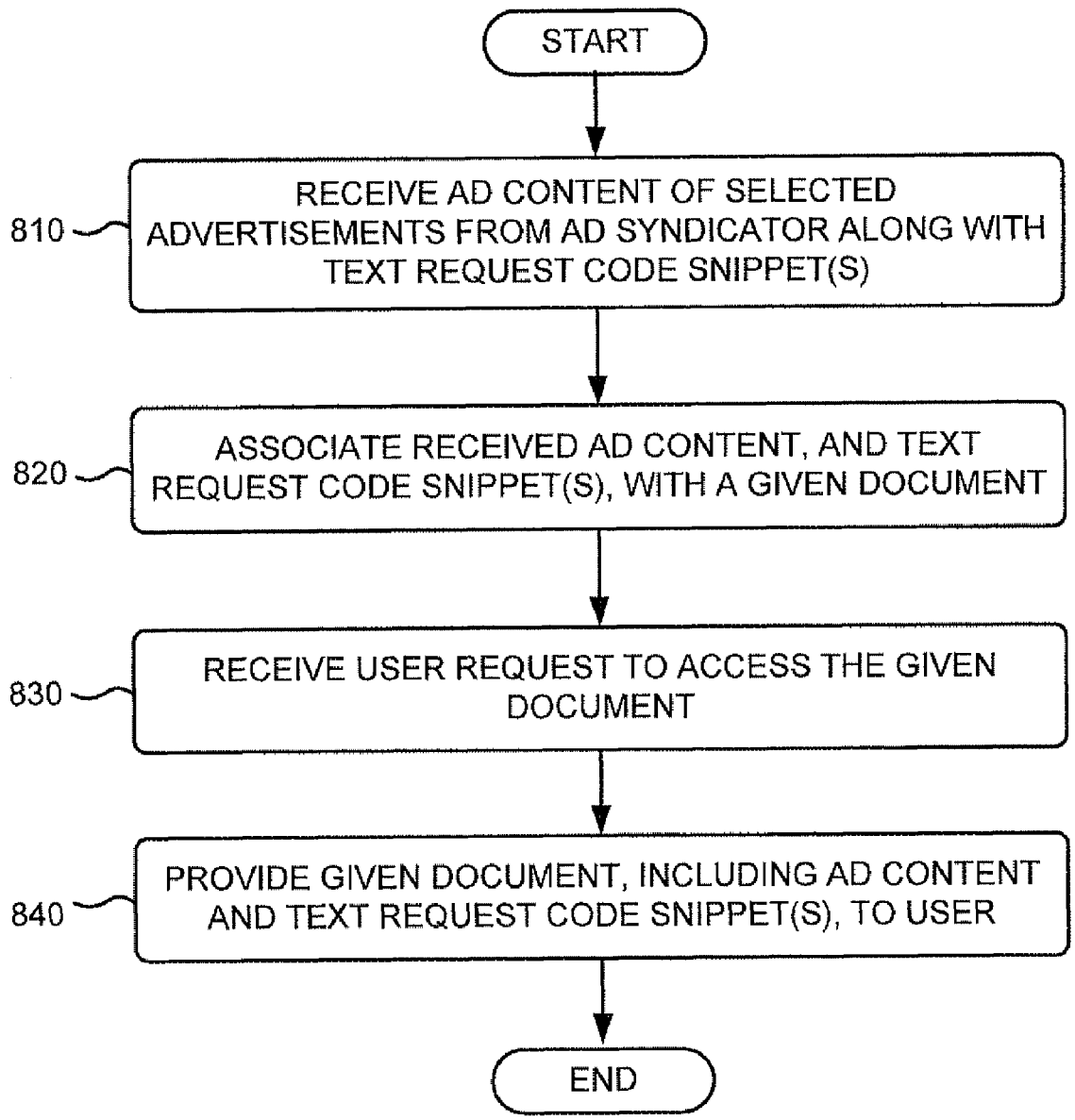
FIG. 8 is a flowchart of an exemplary process for providing a hosted document that includes ad content and a text request code snippet(s) from the publisher to a client of FIG. 2 consistent with principles of the invention.

FIG. 8 is a flowchart of an exemplary process for providing a hosted document that includes ad content and a text request code snippet(s) from a publisher 230 to a browser at a client 205 consistent with principles of the invention. The process exemplified by FIG. 8 may be implemented by a publisher 230.

The exemplary process may begin with the receipt of ad content of selected advertisements from ad syndicator 130, along with the corresponding text request code snippet(s), at publisher 230 (block 810). Publisher 230 may receive the ad content and text request code snippet(s) from ad syndicator 130 via network 250. The received ad content, and an associated text request code snippet(s), may be associated with a given document (block 820). Publisher 230 may, for example, insert the ad content into the given document and store the given document in memory.

Figure 9:
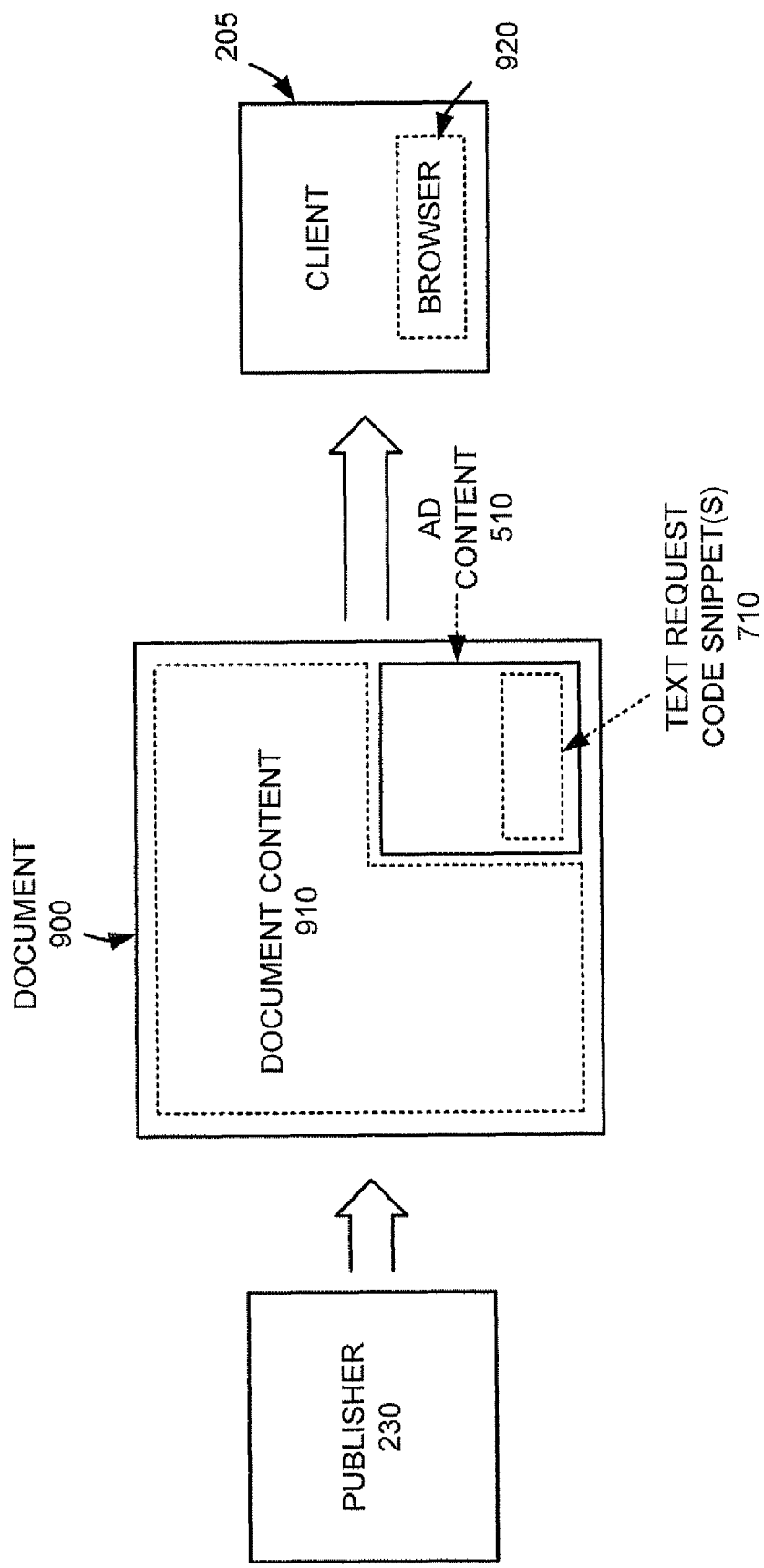
FIG. 9 is a diagram that graphically illustrates the provision of an ad with a text request code snippet(s) from the publisher to a client browser of FIG. 8 consistent with principles of the invention.

A request from a user at a client 205 to access the given document may be received by publisher 230 (block 830). A user at client 205 may use a browser to attempt to access the given document stored at publisher 230. Publisher 230 may provide the given document, including the ad content and corresponding text request code snippet(s), to the user at client 205 (block 840). As shown in FIG. 9, publisher 230 may provide the given document 900, which includes document content 910, ad content 510, and a text request code snippet(s) 710 to browser 920 of a client 205.

Exemplary Client Browser Process

Figure 10:
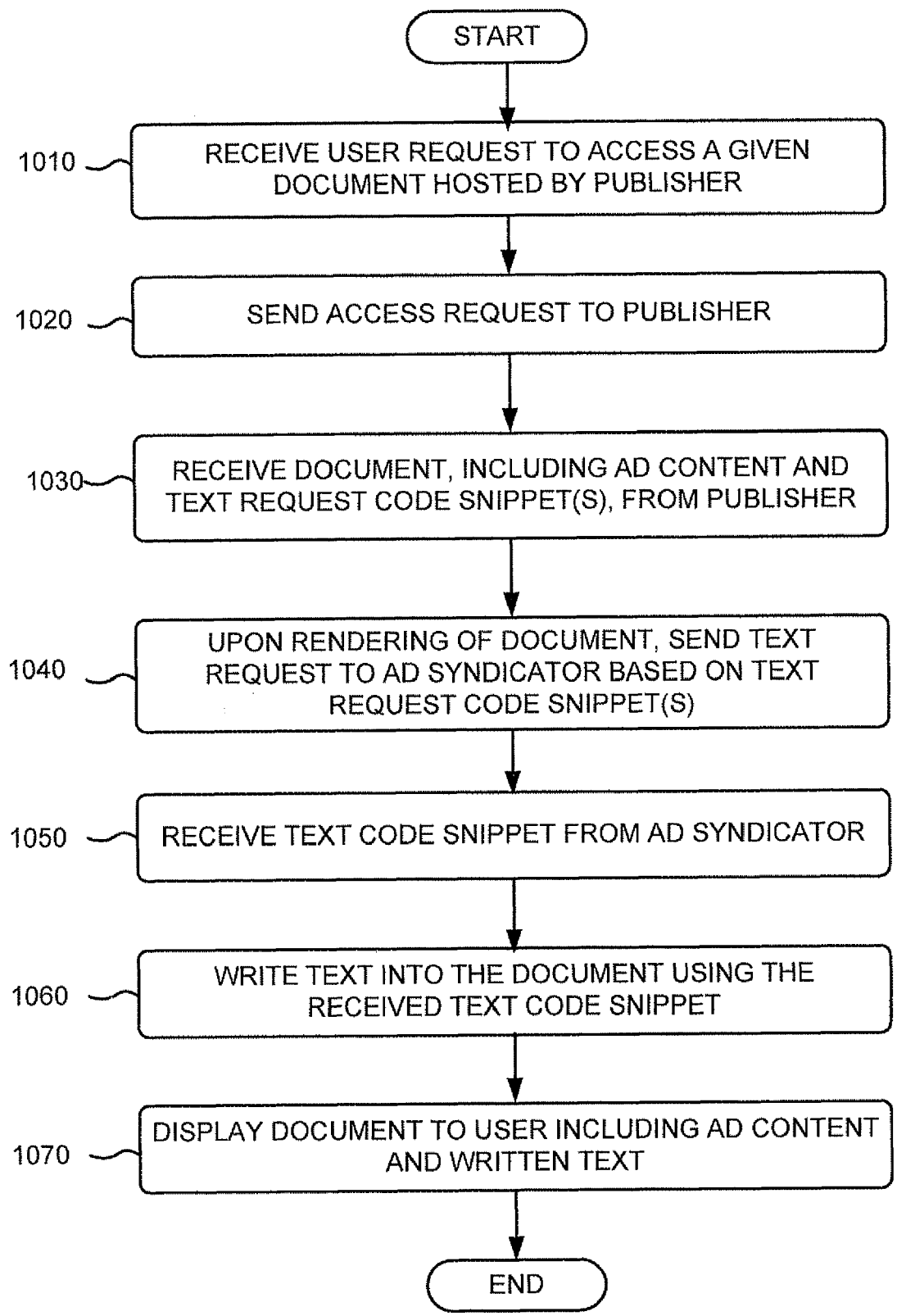
FIG. 10 is a flowchart of an exemplary process for writing trackable text into a document at a browser of a client consistent with principles of the invention.

FIG. 10 is a flowchart of an exemplary process for writing a trackable text into a document at a browser of a client 205 consistent with principles of the invention. The process exemplified by FIG. 10 may be implemented by a browser at a client 205.

The exemplary process may begin with the receipt of a request from a user at client 205 to access a given document hosted by publisher 230 (block 1010). The user, for example, may enter a URL for the given document into a browser at client 205, or may select the URL for the given document from a list of "favorite" documents or sites stored in the browser's toolbar. The browser at client 205 may send an access request to publisher 230 via network 250 (block 1020). The given document, including ad content and a text request code snippet(s), may be received from publisher 230 (block 1030). In response to receipt of the access request from the browser at client 205, publisher 230 may send the given document to the browser via network 250.

Upon rendering the received document, the browser at client 205 may send a text request to ad syndicator 130 based on the text request code snippet(s) (block 1040). The browser at client 205 may render the given document upon receipt from publisher 230. During rendering, the browser may execute the text request code snippet(s) included in the given document. Execution of the text request code snippet(s) may cause browser to send a text request to ad syndicator 130 via network 250.

A text code snippet may be received from ad syndicator 130 (block 1050). The text code snippet may include HTML or Javascript code that instructs the web browser how to render text through a document write method (e.g., using the command document.write( ) in Javascript). Text may be written into the document using the received text code snippet (block 1060). The text code snippet may instruct the browser how to format and display the text when writing the text into the document. The text code snippet may instruct the browser on the content, appearance and format of the text to be written. For example, the text code snippet may instruct the browser to write text into the document that is substantially similar to textual content already contained in the document. The written text may, therefore, be similar in font, color, style, etc., to content already contained in the document. In one implementation, the text code snippet may instruct the browser to render a link in the document that appears similar to, and operates similar to, existing hypertext links.

Figure 11:
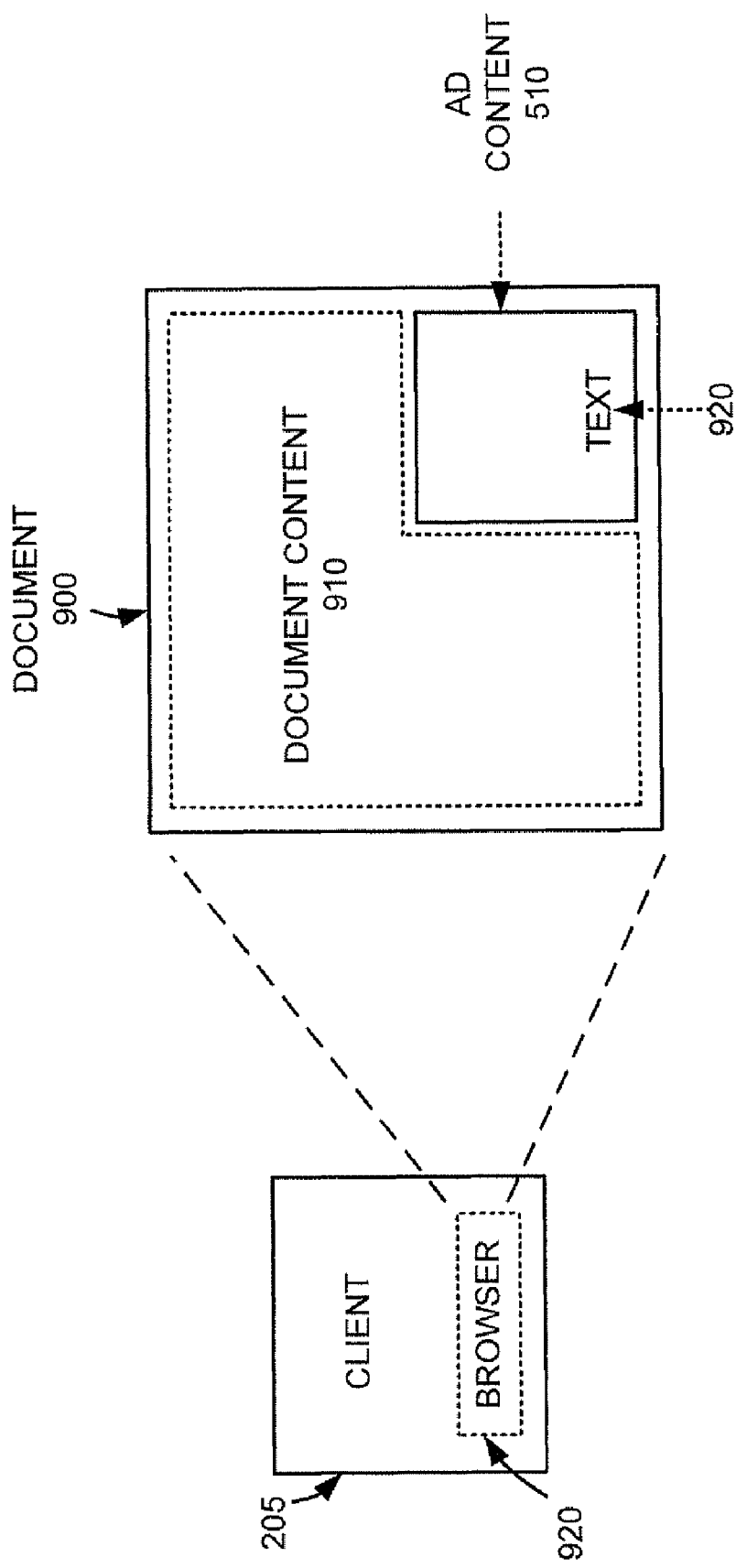
FIG. 11 is a diagram that graphically illustrates browser display of a document having ad content and associated trackable text consistent with principles of the invention.

The document may be displayed to the user, including the ad content and the written text (block 1070). The browser may display the document, including the written text, to the user. The user may subsequently select a link included in the written text (e.g., by "clicking" on the link) and the link may cause the browser to, for example, access an ad landing document hosted at a corresponding advertiser 210. FIG. 11 graphically illustrates the display of document 900 at browser 920 of client 205. Document 900 may include document content 910, ad content 510 and text 920 written into document 900 based on execution of the text code snippet.

Figure 12:
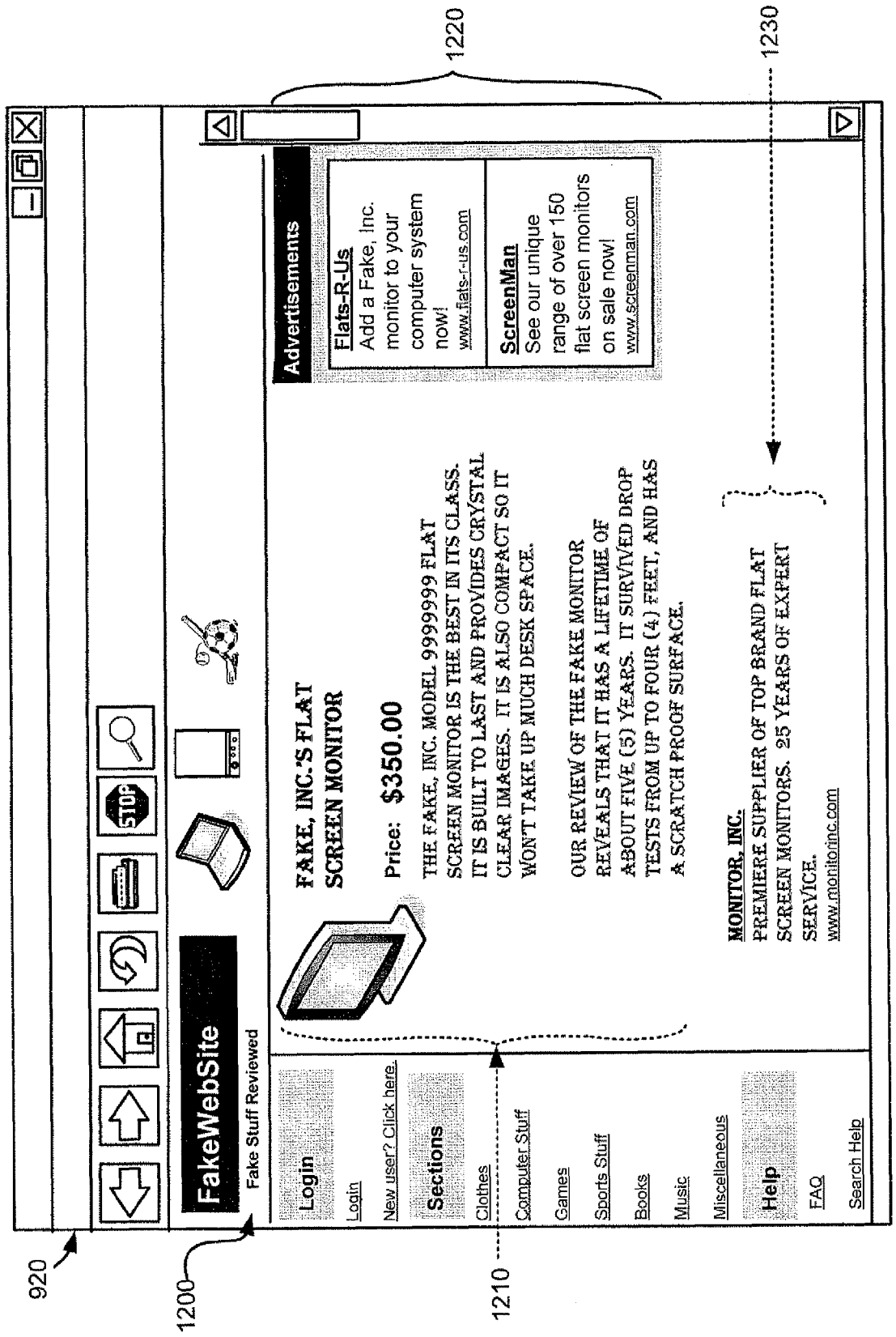
FIG. 12 is a diagram of an exemplary document that includes content, advertisements, and trackable text written into the document consistent with principles of the invention.

FIG. 12 further depicts an illustrative example of web browser 920 displaying a document 1200 that includes content 1210 and advertisement creatives 1220. Document 1200 additionally includes text 1230 written into document 1200 based on execution of the text code snippet. As shown in FIG. 12, text 1230 is substantially similar in format and appearance (i.e., font) to content 1210 of document 1200. The text code snippet provided by ad syndicator 130 may, thus, control the content, format and appearance of a portion of ad content provided for insertion in a publisher's document. The text code snippet may also include additional features for the written text. For example, the text code snippet may include code for an "OnHover" method which would allow custom branding/messaging to be displayed when a cursor (e.g., a mouse) at a browser of a client 205 is "hovered" over the text.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4, 8 and 10, the order of the acts may be modified in other implementations consistent with the principles of the invention. Further, non-dependent acts may be performed in parallel. Though some aspects of the invention have been described as involving syndicated ad content, principles of the invention may be applied to any type of syndicated content. When applied to any type of syndicated content, a syndicator can insert a text request code snippet in content provided to a publisher, and the syndicator, upon receipt of a text request, may provide a text code snippet that controls the content, format and appearance of text rendered at the publisher in a document.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:

transmitting, using one or more processing units associated with the one or more server devices, a first snippet of code to a publisher, where the first snippet of code includes code that accepts a text identifier and a publisher identifier;

receiving, using one or more processing units associated with the one or more server devices, a request message from a browser that has accessed a document at the publisher that includes the first snippet of code, where the request message includes the text identifier and the publisher identifier; and transmitting, using one or more processing units associated with the one or more server devices, a second snippet of code, based on receipt of the request message, that writes a portion of text into the document when the document is rendered at the browser, where the second snippet of code controls the portion of text to have a content and a format dependent on the text identifier and on the publisher identifier included in the received request message, where controlling the format includes controlling at least one of a font or a style of text in the portion of text.

2. The method of claim 1, where the second snippet of code includes instructions directing the browser to display custom branding and/or messaging when a cursor is "hovered" over the portion of text.

3. The method of claim 1, where the first and second snippets of code comprise hypertext markup language (HTML) or Javascript code.

4. The method of claim 1, where the portion of text includes a link and where the second snippet of code instructs the browser to write the link into the document with a particular format, appearance and content.

5. A method performed by one or more server devices, the method comprising:

matching, using one or more processing units associated with the one or more server devices, advertisements with content of a document to obtain a matched set of advertisements;

selecting, using one or more processing units associated with the one or more server devices, an advertisement from the matched set of advertisements based on bids;

receiving, using one or more processing units associated with the one or more server devices, the document that includes first code to request a link when the document is rendered by a browser, where the first code includes code to accept a text identifier and a publisher identifier;

sending, using one or more processing units associated with the one or more server devices, a request for the link based on the first code, where the request includes the text identifier and the publisher identifier;

receiving, using one or more processing units associated with the one or more server devices, second code corresponding to the link in response to the link request, where the second code controls the link to have an appearance and format based on the text identifier and the publisher identifier, where controlling the appearance and format includes controlling at least one of a font or a style of text in the link; and providing, using one or more processing units associated with the one or more server devices, instructions for visually rendering the link in the document using the second code.

6. The method of claim 5, where the link comprises a hyperlink.

7. The method of claim 5, where the first code comprises a snippet of hypertext markup language (HTML) or Javascript code.

8. The method of claim 5, where the link includes a reference to an advertisement landing document.

9. A system, comprising:

a memory to store ad content, where the ad content includes first code to request a link when the ad content is rendered by a browser and to accept a text identifier and a publisher identifier;

a communication interface coupled to a network; and a processing unit to:

receive one or more keywords associated with a document;

receive one or more advertising bids corresponding to the one or more keywords;

select the ad content based on the one or more advertising bids;

incorporate the ad content into a document and provide the document via the network using the communication interface, receive link requests from browsers at a plurality of clients via the network using the communication interface, where the link requests include the text identifier and the publisher identifier, and send, using the communication interface and based on the text identifier and the publisher identifier, second code to the browsers for writing a link into the ad content, where the link includes a reference to an advertising document, and where the second code controls the link to have at least on of a font or a style of text in the link based on the text identifier and the publisher identifier.

10. The system of claim 9, where the processing unit is to track each time the second code is sent to the browsers.

11. The system of claim 9, where the second code controls the link to have a same appearance and format as text already contained in the document.

12. A method performed by one or more server devices, the method comprising:

sending, using one or more processing units associated with the one or more server devices, ad content to a publisher, where the ad content includes a first snippet of code;

receiving, using one or more processing units associated with the one or more server devices, requests from browsers accessing a document at the publisher that includes the ad content, where the browsers send the requests based on execution of the first snippet of code, and where the requests include a text identifier and a publisher identifier;

transmitting, using one or more processing units associated with the one or more server devices, based on receipt of the requests, a second snippet of code to the browsers that instructs the browsers on a content, format and appearance of text to be inserted within the document, where the content and the format are based on the text identifier and on the publisher identifier, and where the format includes at least one of a font or a style of text; and tracking, using one or more processing units associated with the one or more server devices, each transmission of the second snippet of code to determine a number of times the text has been displayed at the browsers.

13. The method of claim 12, where the ad content is based on one or more advertising bids corresponding to one or more keywords associated with the document.

14. The method of claim 12, where the second snippet of code instructs the browsers to cause text to be inserted within the document to have a same content, format and appearance as text already present in the document.

* * * * *